Patented Dec. 29, 1953

2,664,423

UNITED STATES PATENT OFFICE 2,664,423

4 - (CYCLOPENTANOPOLYHYDROPHENANTHR-17-YL) IMIDAZOLES AND DERIVATIVES THEREOF

Kurt Rorig, Chicago, Ill., assignor to G. D. Searle & Co., Chicago, Ill., a corporation of Illinois No Drawing. Application March 12, 1952, Serial No. 276,238

10 Claims. (Cl. 260—239.5)

The present invention pertains to a new group of polycyclic imidazole derivatives, and more particularly, to the 4-cyclopentanopolyhydrophenanthr-17-ylimidazoles and their salts. These imidazoles can be represented by the structural formula

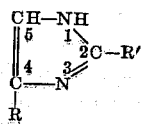

wherein R is a 16,17-dihydro-15H-cyclopenta-[a]polyhydrophenanthryl nucleus attached to the imidazole ring through the carbon in the 17-position of the cyclopentanophenanthrene nucleus and R' is hydrogen, a lower alkyl, or lower aryl radical.

These compounds are conveniently prepared in a single reaction vessel by treating an acylated 17 - (β - hydroxyacetyl) - 16,17 - dihydro-15H-cyclopenta[a]polyhydrophenanthrene of the type

R—CO—CH$_2$—OX wherein R is a 16,17-dihydro-15H-cyclopenta-[a]polyhydrophenanthrene nucleus attached to the —CO radical through the carbon in the 17-position, and X is a readily hydrolyzable lower acyl radical, with an aqueous solution of a lower aliphatic or aromatic aldehyde, ammonium hydroxide, and a cupric salt such as cupric acetate. Under the influence of these reagents, there apparently occur the following three consecutive transformations (1) The radical X is hydrolyzed and replaced by a hydrogen atom.

(2) The resulting carbinol radical is oxidized to an aldehyde of the type

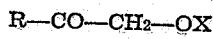

(3) The resulting aldehyde is condensed with 2 moles of ammonia and 1 mole of an aldehyde of the type

R'CHO to form the imidazole ring

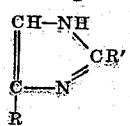

R' being a hydrogen, lower alkyl or lower aryl radical. Obviously the intermediate reaction products in the above scheme can also be used directly as starting materials, i. e., the free carbinols, in which X is hydrogen, and the α,β-dicarbonyl compounds.

The reaction is applicable to the 17-(β-hydroxyacetyl) - 16,17 - dihydro - 15H - cyclopenta-[a]polyhydrophenanthrenes and the corresponding 17-(β - acyloxyacetyl) derivatives thereof. Examples of suitable 17-(β-hydroxyacetyl) compounds are 3,21-dihydroxy-pregnan-20-one, 3,21-dihydroxy - 5 - pregnen - 20-one, desoxycorticosterone, corticosterone, 11-dehydrocorticosterone, 17 - hydroxydesoxycorticosterone, 17 - hydroxycorticosterone and 17-hydroxy-11-dehydrocorticosterone. The 21-hydroxy group may be esterified by such acids as formyl, acetyl, propionyl and benzoyl. Among the aldehydes suitable for this reaction are formaldehyde, acetaldehyde, propionaldehyde, butyraldehyde, isobutyraldehyde, benzaldehyde, p-tolualdehyde and the like. An excess over the theoretical two moles of ammonia is used to keep the cupric ion in solution.

The imidazoles which constitute this invention contain both an acidic imido group and a basic nitrogen and therefore form salts with both acids and metal ions. Among the acids which have been found useful are such inorganic and strong organic acids as sulfuric, phosphoric, hydrochloric, hydrobromic, sulfamic, citric, oxalic and ascorbic acids. Salts are also formed with alkali and alkaline earth metals as well as with copper, silver and, presumably, gold.

The imidazoles which constitute this invention are valuable chemotherapeutic agents, especially because of their valuable regulatory effect on the cardiovascular system and their anti-hormonal activity. The following examples illustrate in detail certain of the imidazoles which constitute this invention and methods for their preparation. However, this invention is not to be construed as limited thereby in spirit or in scope since it will be apparent to those skilled in the art of organic synthesis that many modifications in materials and methods may be practiced without departing from the scope of this invention. In these examples temperatures are given in degrees centigrade (°C.) and relative amounts of materials in parts by weight.

*Example 1*

A solution of 4.3 parts of 36% aqueous formaldehyde, 10 parts of cupric acetate, 68 parts of 26% aqueous ammonium hydroxide and 2 parts of 3β,21-dihydroxy-5-pregnen-20-one 21-acetate (21-acetoxypregnenolone) in 180 parts of absolute ethanol is refluxed for an hour under a nitrogen atmosphere. The solution is cooled to give a light gray precipitate of the copper salt of the 4-(1,2,3,4,7,8,9,10,11,12,13,14,16,17-tetradecahydro - 10,13 - dimethyl-3β-hydroxy-15H)-cyclopenta[a]phenanthr-17-ylimidazole which is collected on a filter and dried. This salt melts at about 325° C. with decomposition. A second crop of this copper salt is obtained by diluting the filtered reaction mixture with 600 parts of water.

The combined copper salts are suspended in 75 parts of water and heated on the steam bath while a stream of gaseous hydrogen sulfide is passed into the suspension for one-half hour to precipitate the copper sulfide and free the imidazole derivative. The precipitate is collected on a filter and extracted by boiling with 100 parts of absolute ethanol and hot filtration. The filtrate is concentrated to one-fifth of its original volume and cooled to yield as a precipitate the white, powdery 4 - (3β - hydroxy-5-androstan-17-yl)- imidazole, which melts at about 298–300° C. with decomposition.

A crystalline hydrochloride is obtained by treatment of an isopropanol solution with one equivalent of a 25% solution of hydrogen chloride in anhydrous isopropanol. It has the structural formula

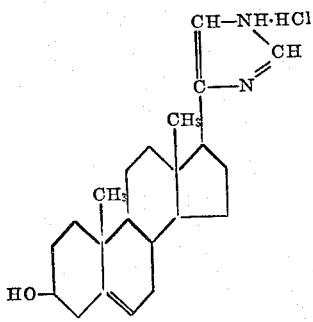

*Example 2*

A solution of 0.4 parts of isobutyraldehyde, 6 parts of cupric acetate, 50 parts of 26% aqueous ammonium hydroxide, and one part 3β,21-dihydroxy-5-pregnen-20-one in 90 parts of ethanol is heated at reflux temperature for 50 minutes under a nitrogen atmosphere. The mixture is then diluted with 200 parts of cold water and the grayish precipitate is collected on a filter, washed with water and dried. The copper salt of the 2-isopropyl - 4 - (1,2,3,4,7,8,9,10,11,12,13,14,16,17-tetradecahydro - 10,13 - dimethyl - 3β - hydroxy-15H)-cyclopenta[a]phenanthr - 17 - ylimidazole thus obtained melts above 300° C. Treatment with hydrogen sulfide as in Example 1 yields the 2 - isopropyl - 4-(3β-hydroxy-5-androsten-17-yl) imidazole in small, colorless, high melting crystals. It has the structural formula

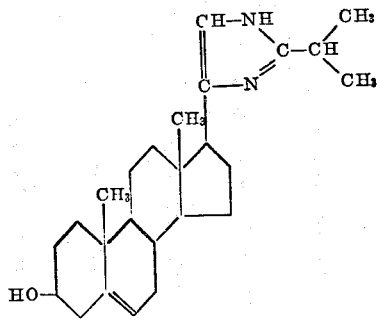

*Example 3*

A solution of 2 parts of 36% aqueous formaldehyde, 5 parts of cupric acetate, 34 parts of 26% aqueous ammonium hydroxide and one part of 3β,21-dihydroxy-pregnan-20-one 21-acetate in 100 parts of absolute ethanol is heated at reflux temperature for an hour under nitrogen and then cooled and diluted with 200 parts of water. The brownish precipitate of the copper salt of the 4-(10,13 - dimethyl - 3β - hydroxyperhydro - 15H)-cyclopenta[a]phenanthr-17-ylimidazole is collected on a filter, washed with water and dried. The salt melts unsharply above 300° C. with decomposition. The high melting, white, powdery 4-(3β-hydroxyandrostan-17-yl)imidazole is isolated as in Example 1. It has the structural formula

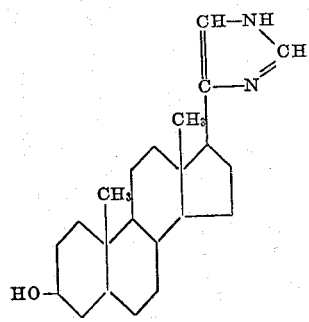

*Example 4*

A solution of 2 parts of 36% aqueous formaldehyde, 5 parts of cupric acetate, 34 parts of 26% aqueous ammonium hydroxide and one part of desoxycorticosterone acetate in 100 parts of ethanol is refluxed for an hour under a nitrogen atmosphere and then cooled. After dilution with 400 parts of water the grayish-brown precipitate is collected on a filter, washed with water and dried. There is obtained the copper salt of 4 - (1,2,3,6,7,8,9,10,11,12,13,14,16,17 - tetradecahydro-10,13-dimethyl-3-oxo - 15H) - cyclopenta[a] phenanthr-17-ylimidazole which decomposes at a temperature above 300° C. The free imidazole is liberated by treatment with hydrogen sulfide as in Example 1. This 4-(3-oxo-4-androsten-17-yl)imidazole is obtained as a white, fine crystalline solid. It has the structural formula

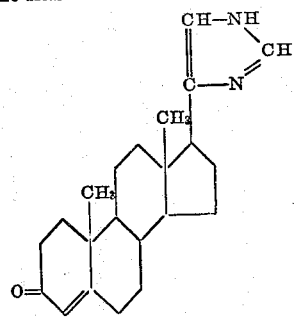

*Example 5*

A solution of 20 parts of desoxycorticosterone, 100 parts of cupric acetate, 15.5 parts of acetaldehyde and 90 parts of 26% ammonium hydroxide in 800 parts of ethanol is heated to boiling in a nitrogen atmosphere. Then 36 parts of additional 26% ammonium hydroxide and 15.5 parts of acetaldehyde in 400 parts of ethanol are added and heating at reflux temperature in a nitrogen atmosphere is continued for 55 minutes. At that time an additional quantity of 23 parts of 26% ammonium hydroxide is added and after 30 minutes of further heating at reflux temperature the mixture is diluted with 800 parts of water and cooled in an ice bath. The brownish copper salt of the 2-methyl-4-(1,2,3,6,7,8,9,10,11,12, 13,14,16,17 - tetradecahydro - 10,13 - dimethyl-3-oxo - 15H) - cyclopenta[a]phenanthr-17-ylimidazole is collected on a filter, suspended in 500 parts of hot water and treated with a stream of hydrogen sulfide for 30 minutes. After cooling and filtration the black residue is extracted with 600 parts of ethanol and the yellow extract is concentrated to a syrup. The latter is treated with 50 parts of acetone to induce crystallization of the 2-methyl-4-(3-oxo-4-androsten-17-yl)imidazole which melts at about 241–244° C. with decomposition. It has the structural formula

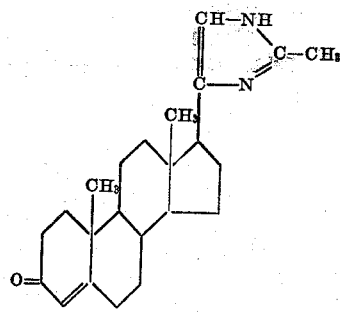

*Example 6*

A mixture of 57 parts of benzaldehyde and 50 parts of cupric acetate in 400 parts of 26% aqueous ammonium hydroxide with 10 parts of desoxycorticosterone acetate in 1200 parts of ethanol is heated at reflux temperature for 90 minutes under a nitrogen atmosphere. The mixture is cooled and diluted with 2000 parts of water whereupon the brown precipitate of the copper salt of the 2-phenyl-4-(1,2,3,6,7,8,9,10,11,12,13,14,16,17 - tetradecahydro - 10,13-dimethyl-3 - oxo - 15H) - cyclopenta[a]phenanthr - 17-yl)imidazole is collected on a filter and washed with water. This copper salt melts unsharply above 300° C. The free imidazole is isolated as in Example 1 as a high melting, whitish, microcrystalline powder. This 2-phenyl-4-(3-oxo-4-androsten-17-yl)imidazole has the structural formula

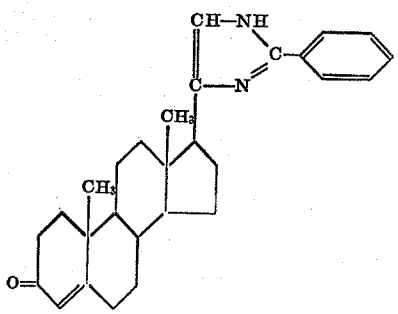

*Example 7*

A solution of 10 parts of 36% aqueous formaldehyde, 25 parts of cupric acetate, 170 parts of 26% aqueous ammonium hydroxide, and 5.2 parts of 17-hydroxydesoxycorticosterone 21-acetate in 450 parts of absolute ethanol is refluxed for 90 minutes under nitrogen and then cooled to yield the grayish-brown precipitate of the copper salt of 4-(1,2,3,6,7,8,9,10,11,12,13,14,16,17-tetradecahydro - 10,13 - dimethyl - 3 - oxo - 17-hydroxy - 15H) - cyclopenta[a]phenanthr - 17-ylimidazole which melts unsharply above 280° C. The free imidazole is liberated as in Example 1 and obtained in the form of small, white, crystalline needles. This 4 - (3 - oxo - 17 - hydroxy-4-androsten-17-yl)imidazole has the structural formula

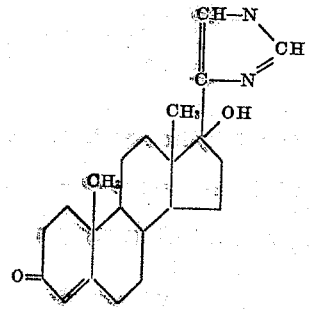

*Example 8*

A solution of 0.6 part of propionaldehyde, 10 parts of cupric acetate, 70 parts of 26% aqueous ammonium hydroxide and 2 parts of 17-hydroxycorticosterone acetate in 200 parts of ethanol is heated at reflux temperature for 100 minutes under a nitrogen atmosphere. After cooling the brownish precipitate of the copper salt is collected on a filter, washed with water and dried. It decomposes above 300° C. An additional yield is obtained by diluting the filtrate with a large volume of water. Treatment with hydrogen sulfide, as in Example 1, yields the free 2 - ethyl - 4 - (3 - oxo - 11,17 - dihydroxy-4 - androsten - 17 - yl)imidazole in small, white needles. It has the structural formula

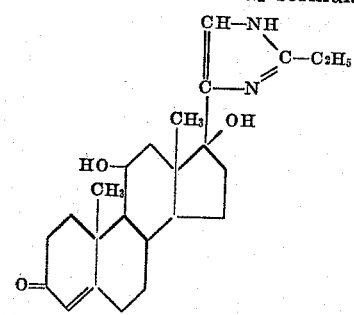

I claim:
1. A compound of the structural formula

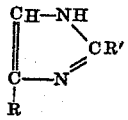

wherein R is a member of the class consisting of 17-androstane and 17-androstene radicals containing a member of the class consisting of oxo and hydroxy radicals in at least one of the positions 3, 11 and 17 and wherein R' is a member of the class consisting of hydrogen, lower alkyl and phenyl radicals.

2. 4-(3β-hydroxy-5-androsten-17-yl)imidazole.
3. A compound of the structural formula

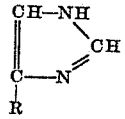

wherein R is a 3-hydroxyandrosten-17-yl radical.
4. 4-(3-oxo-4-androsten-17-yl)imidazole.
5. A compound of the structural formula

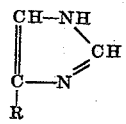

wherein R is a 3-oxoandrosten-17-yl radical.

6. 4-(3β-hydroxy-androstan-17-yl)imidazole.
7. A compound of the structural formula

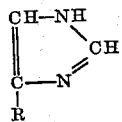

wherein R is a 3-hydroxyandrostan-17-yl radical.

8. 2 - methyl - 4 - (3 - oxo - 4 - androsten - 17 - yl)imidazole.

9. A compound of the structural formula

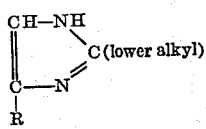

wherein R is a 3-hydroxyandrosten-17-yl radical.

10. A compound of the structural formula

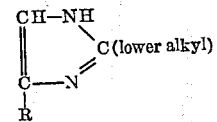

wherein R is a 3-oxoandrosten-17-yl radical.

KURT RORIG.

References Cited in the file of this patent

UNITED STATES PATENTS

| Number | Name | Date |
| --- | --- | --- |
| 2,161,298 | Miescher | June 13, 1939 |